No. 727,048. PATENTED MAY 5, 1903.
W. J. WISWALL.
CULTIVATOR.
APPLICATION FILED AUG. 11, 1902.
NO MODEL

Witnesses:
Inventor:
Wm. J. Wiswall.
By Fischer & Sharpe
Attys

No. 727,048. Patented May 5, 1903.

UNITED STATES PATENT OFFICE.

WILLIAM J. WISWALL, OF KANSAS CITY, MISSOURI.

CULTIVATOR.

SPECIFICATION forming part of Letters Patent No. 727,048, dated May 5, 1903.

Application filed August 11, 1902. Serial No. 119,236. (No model.)

*To all whom it may concern:*

Be it known that I, WILLIAM J. WISWALL, a citizen of the United States, residing at Kansas City, in the county of Jackson and State of Missouri, have invented certain new and useful Improvements in Cultivators, of which the following is a specification.

My invention relates to cultivators of that class in which rollers are provided to carry the major portion of the weight of the machine and crush the clods and lumps and pulverize the soil preliminary to its engagement by the cultivating appliances; and my object is to produce a machine of this character of simple, strong, durable, and inexpensive construction and which having but few adjustable parts is easy to operate and not liable to get out of order.

Figure 1:
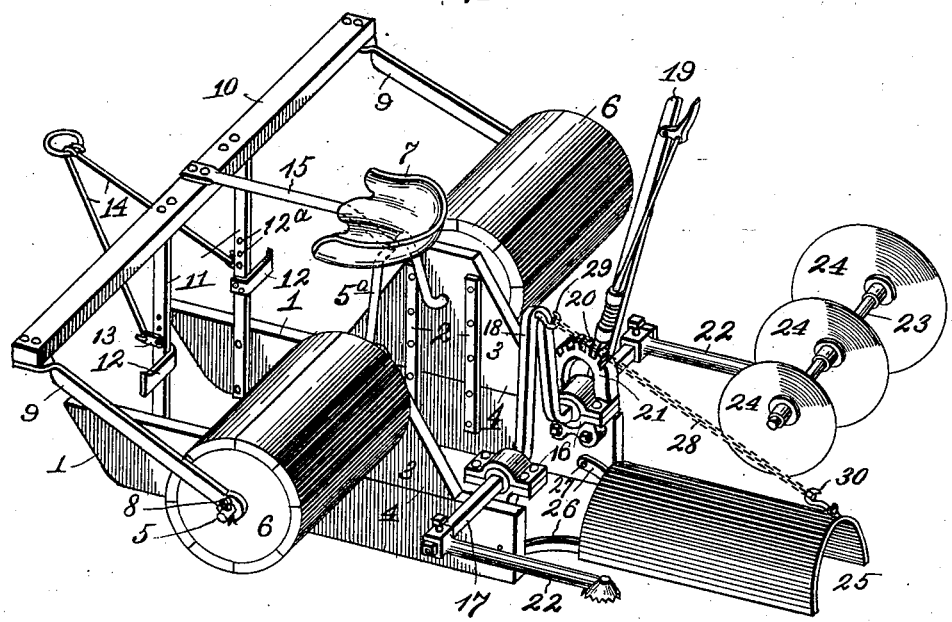
Figure 2:
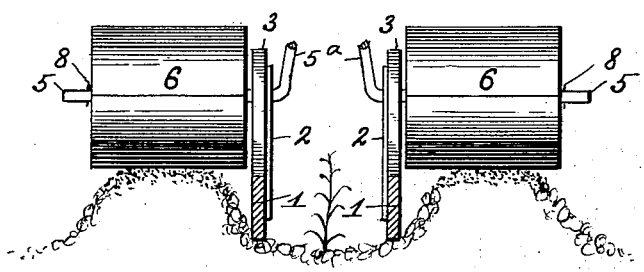

Referring to the accompanying drawings, Figure 1 represents a perspective view of my improved cultivator with the disks and shaft removed from the near side thereof. Fig. 2 is a detail cross-sectional view of the runners and shaft with rollers journaled on the latter.

In constructing my improved machine I employ a pair of runners 1, adapted to carry the machine when on the road and to guide it over the rows in the field by traveling along in the furrows. Rigidly secured near the central top portion of the runners with cleats 2 are bearing-blocks 3, having broad bases 4 resting on the runners. Said bearing-blocks taper toward their upper ends and carry a stationary transverse shaft 5, arched at its central portion $5^a$ to clear the plants under cultivation and also to provide a support for the driver's seat 7. The opposite end portions of the transverse shaft extend outwardly beyond the bearing-blocks to receive cylindrical rollers 6, journaled thereon and arranged at such height as to practically carry all the weight of the machine when traveling over the ridges in the field, and thereby serve to crush clods and lumps, pulverize the soil in advance of the cultivating appliances, and lighten the draft of the machine. Said rollers are held in position on the ends of the shaft by spring-cotters 8 and braces 9, secured at their opposite ends to the terminals of the shaft and a cross-bar 10 at the upper front portion of the machine. Cross-bar 10 is supported by standards 11, secured at their lower ends to the front portions of the runners and provided near their central portions with foot-rests 12 for the convenience of the driver. The standards also have perforations $12^a$ to adjustably receive links 13, to which the draft-rods 14 are hooked.

15 indicates a brace extending from the central portion of the cross-bar to the arch 4 of the transverse shaft to rigidly secure said arched portion in an upright position and provide a stable support for the driver's seat.

The rear portions of the runners are provided with boxes 16 to receive a journaled shaft 17, having a central arch 18 to clear the plants under cultivation. Said shaft is operated by a hand-lever 19, arranged within convenient reach of the driver and provided with a spring-latch 20, adapted to engage a notched segment 21 on the cap of one of the boxes 16 for the purpose of locking said shaft at any point of its adjustment. The opposite terminals of shaft 17 extend outwardly a suitable distance from the boxes to receive arms 22, adjustably carrying at their rear ends shafts 23, provided with a plurality of disks 24.

Arms 22 are laterally adjustable upon shafts 17 in order that the disks or other cultivating appliances employed may be made to follow in the path of the rollers, and thereby increase their effectiveness by operating on soil free from lumps and clods.

During the first cultivation of the corn the young plants are protected from being covered with earth by a fender 25, formed into an arch and provided at its forward opposite sides with arms pivotally secured to the rear portions of the runners with bolts 27. Said fender is simultaneously raised and lowered with the cultivating appliances by means of a chain 28, attached at its opposite ends to hooks 29 30, respectively, on arch 18 and the rear end of the fender.

Having thus described my invention, what I claim, and desire to secure by Letters Patent, is—

1. A cultivator comprising a pair of runners, bearings secured thereon, an arched shaft carried by the bearings and provided with a seat, cylindrical rollers journaled upon the opposite sides of the shaft at a suitable distance above the runners, bearings upon the rear portions of the runners, a shaft journaled therein, a hand-lever for operating the shaft, and disks suitably secured to the opposite sides of the shaft, substantially as shown and described.

2. A cultivator comprising a pair of runners, an arched transverse shaft carried on the runners and provided with a seat, cylindrical rollers journaled on the opposite sides of the shaft a suitable distance above the runners, standards secured to the forward portions of the runners, a cross-bar secured to the upper ends of the standards, braces secured at their opposite ends to the terminals of the shaft and cross-bar, a brace secured at its opposite ends to the arched portion of the shaft and the central portion of the cross-bar, and cultivating appliances suitably secured to the rear of the runners, and arranged to follow the rollers, substantially as shown and described.

3. A cultivator comprising a pair of runners, an arched transverse shaft carried on the runners and provided with a seat, cylindrical rollers on the opposite sides of the shaft, standards secured to the forward portions of the runners, foot-rests thereon, a cross-bar secured to the upper ends of the standard, braces secured at their opposite ends to the terminals of the arched shaft and cross-bar, bearings secured at the rear ends of the runners, a transverse arched shaft journaled therein, a hand-lever for operating the latter, cultivating appliances secured to the opposite sides of the shaft, and a fender pivotally secured to the rear ends of the runners, substantially as described.

4. A cultivator, comprising a pair of runners, a cross-bar supported therefrom, and rollers at opposite sides of the runners and supported at their opposite ends from said runners and cross-bar.

5. A cultivator comprising a pair of runners, a cross-bar supported therefrom, a shaft rearward of the cross-bar and also supported from the runners, rollers journaled on said shaft outward of the runners, and braces connecting the outer ends of the said shaft with the cross-bar.

6. A cultivator, comprising, a pair of runners, a cross-bar supported therefrom, rollers at opposite sides of the runners, and supported at their opposite ends from said runners and the cross-bar, and cultivating appliances rearward and in the path of said rollers.

7. A cultivator, comprising runners, a cross-bar supported therefrom, a shaft rearward of the cross-bar and also supported from said runners, and provided between the latter with an arch, a brace connecting the cross-bar and arch, and a seat upon the latter.

8. A cultivator, comprising a pair of runners, a cross-bar supported therefrom, rollers at opposite sides of the runners and supported at their opposite ends from said runners and the cross-bar, cultivating appliances rearward and in the path of said rollers, and a fender between said cultivating appliances and behind the runners.

In testimony whereof I affix my signature in the presence of two witnesses.

WILLIAM J. WISWALL.

Witnesses:
F. G. FISCHER,
G. Y. THORPE.